United States Patent [19]
Coordes

[11] 3,780,819
[45] Dec. 25, 1973

[54] LAND VEHICLE
[75] Inventor: John E. Coordes, Birmingham, Mich.
[73] Assignee: The United States of America as represented by the Secretary of the Army, Washington, D.C.
[22] Filed: Sept. 13, 1971
[21] Appl. No.: 180,018

[52] U.S. Cl. .......... 180/14 A, 180/24.07, 180/66 B, 180/44 M, 192/3 R, 303/7, 280/423, 303/9
[51] Int. Cl. ............................................. B62d 59/04
[58] Field of Search ............. 180/14 A, 14 R, 66 B, 180/66 R, 44 M; 192/3 R; 303/9, 7; 280/111, 423, 492

[56] References Cited
UNITED STATES PATENTS

| | | | |
|---|---|---|---|
| 2,630,871 | 3/1953 | Simpkins | 180/14 A |
| 2,733,771 | 2/1956 | Sullivan | 180/14 A X |
| 3,059,416 | 10/1962 | Campbell | 192/3 R |
| 3,285,672 | 11/1966 | Avrea | 303/9 |
| 3,293,942 | 12/1966 | Stein et al. | 180/14 A X |
| 3,379,008 | 4/1968 | Manganaro | 180/66 B X |
| 3,253,683 | 5/1966 | Stein | 193/3 R |
| 3,099,460 | 7/1963 | Sheehan | 280/423 R |
| 3,494,632 | 2/1970 | Bostrom | 180/24.02 X |
| 1,932,698 | 10/1933 | Jose | 180/66 B |
| 2,256,302 | 9/1941 | Wehmeier | 180/66 B |
| 3,592,315 | 7/1971 | Lewis | 303/7 |
| 3,484,138 | 12/1969 | Cumming | 303/7 |

FOREIGN PATENTS OR APPLICATIONS

| | | | |
|---|---|---|---|
| 1,180,585 | 2/1970 | Great Britain | 180/14 A |

Primary Examiner—Kenneth H. Betts
Assistant Examiner—John P. Silverstrim
Attorney—Harry M. Saragovitz et al.

[57] ABSTRACT

A tractor-semi-trailer vehicle has a power assist trailer axle in which the trailer axle is connected to be driven by an air motor driving the trailer differential through a clutch. The power assist motor and the clutch receive air from storage tanks on the trailer through a solenoid-operated control valve and a shuttle valve. An operator-operable switch controls the solenoid-operated valve. The tractor rear axle has a roll capability relative to the tractor front axle; since the tractor rear axle defines the attitudinal plane of the semi-trailer axle, the total vehicle can traverse very uneven terrain without lifting a wheel off the ground.

4 Claims, 5 Drawing Figures

INVENTOR
JOHN E. COORDES

BY
H.M. Saragovitz, E.J. Kelly
H. Berl & John F. Schmidt
Attorneys 3,780,819

LAND VEHICLE

The invention described herein may be manufactured, used, and licensed by or for the Government for governmental purposes without payment to me of any royalty thereon.

BACKGROUND OF THE INVENTION

1. Field of the Invention

This invention relates to land vehicles of the tractor-semi-trailer type for off-highway operation, especially vehicles in which the tractor is a multi-axle piece of equipment, and the vehicle as a whole is preferably able to negotiate uneven terrain which often provides traction limitations seldom encountered by highway-type vehicles. More specifically, military carriers should have a versatility that allows them to move swiftly over paved roads and yet be able to move effectively off-highway as the need arises without unloading some of the cargo which might soon be required for the success of the mission.

2. The Prior Art

Commercial carriers are designed, conventionally, for maximum exploitation of the excellent network of paved roads and highways. To reap the greatest economic benefit of the highway system, commercial carriers are big and fast, and as long as they stay on well-maintained, paved roads, collectively they carry a vast tonnage quickly and inexpensively.

Such carriers can, and do, serve military purposes equally well as long as the paved highway system lasts. However, highways are usually prime targets of enemy military tactics, and the success of a mission will probably hang on the capability of the transport system to continue operations off-highway in the face of enemy interdiction of key portions of the paved highway network. Because interdiction often takes the form of destruction of a junction of a number of roads rather than wiping out a substantial length of such road, when that is the form the destruction takes, the carrier should be able to go off-highway to by-pass the destruction and then return to the paved road.

Commercial (prior art) carriers are not designed to carry out such an operation with a high degree of efficiency, because the fast highway carriers are simply unable to traverse cross-country, no-road, terrain. Transfer of cargo to smaller and more versatile carriers is time-comsuming when fast movement is a logistical requirement. Moreover, the exclusive use of smaller carriers, or large carriers designed for off-highway use entirely, is unacceptable because the small carriers have insufficient capacity and conventional off-highway carriers are too slow on paved roads.

SUMMARY OF THE INVENTION

An off-highway multi-axle tractor and semi-trailer vehicle, provided with conventional air brakes, carries extra pressurized air storage capacity on the semi-trailer as part of a power assist system for the trailer, wherein an air motor is connected to the trailer differential to drive the trailer wheels through a pneumatic clutch. The extra air storage capacity is connected through an isolation valve with the trailer conventional brake system and also with a control valve which is a conventional solenoid-operated valve having a spring-centered neutral position, and forward and reverse operating positions. When the valve is centered, or in its neutral position, the air motor connections and the clutch are all vented to atmopshere through a shuttle valve at a point remote from the road surface. Operator-operable switch means selectively connects the solenoid-operated valve with a suitable power source. In a further refinement of the invention, the front and rear axles of the tractor are preferably tiltable relative to each other by virtue of a roll axis connecting the vehicle portions to which those axles are secured by suitable springs. A cut-off valve closes the pressure air line to the air motor whenever pressure in that line falls below a predetermined minimum.

OBJECTS

It is accordingly an object of the invention to provide an off-highway multi-axle tractor and a semi-trailer combination having auxiliary power of an emergency nature for the usually-unpowered trailing axle, the power system being pneumatic and "plugged into" the air brake system of the vehicle so as to derive its compressed air from the source which such vehicles normally carry anyway, namely the compressor mounted on the tractor and driven by the tractor engine.

It is another object of the invention to provide a wheeled land vehicle consisting of an off-highway multi-axle tractor and a semi-trailer, wherein the semi-trailer axle may be driven temporarily in emergencies, and wherein the semi-trailer axle attitude is determined by the attitude of the tractor rear axle because of a roll axis provided in the tractor structure which permits the tractor rear axle to oscillate laterally relative to the tractor front axle.

DESCRIPTION OF A PREFERRED EMBODIMENT

Figure 1:
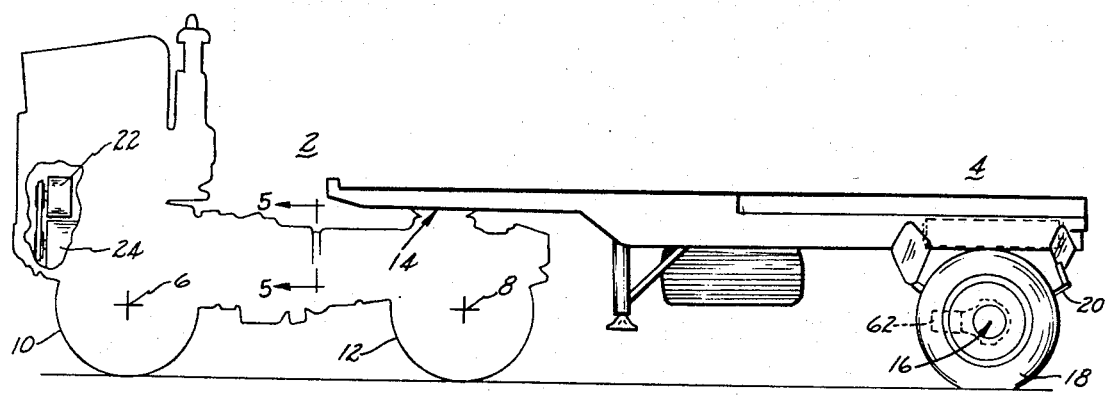
FIG. 1 is a side elevation view of an off-highway land vehicle comprising a two-axle tractor coupled with a semi-trailer, and embodying the invention.

FIG. 1 shows an off-highway land vehicle comprising a multi-axle tractor indicated generally at 2 and a semi-trailer indicated generally at 4.

Tractor 2 is a multi-axle machine; specifically, two axles are here indicated by axes of rotation 6 and 8 for the front and rear, respectively, of the tractor, the axles carrying wheels showing in profile or outline at 10 and 12 respectively.

As here used, the term "axle" has a broad connotation embracing two wheels at opposite ends of one long piece of metal and movable as an entity, or two independently suspended wheels mounted at opposite sides of a frame or body shell and having a substantial or approximate coaxial relationship. Thus the "knee-action," independent suspension of most passenger car front wheels today in the United States come within the meaning of "one axle" as the term is here used. It is moreover not essential that the two wheels be literally coaxial at any time; even the solid front axles of passenger cars of the 1920 era did not mount their wheels coaxially because of a number of design features, such as camber.

The tractor is equipped with a conventional fifth wheel assembly as shown at 14, by which it couples with semi-trailer 4 in a conventional manner. Trailer 4 may have as many supporting axles as needed; in the embodiment shown, one such supporting axle is shown generally at 16. It will be understood that axle 16 will have a wheel system at each end of the axle, i.e., at each side of the trailer, one of such wheel systems being shown at 18 in FIG. 1.

The term "wheel system" is used here to comprehend a single wheel as well as dual wheels, or other multiples of a single wheel. Wheels are suspended conventionally, as for example by a leaf spring such as shown at 20 for the illustrated wheel system 18.

Braking for the off-highway vehicle is conventional, as by a system of air under pressure, well understood by those skilled in the art and needing no detailed explanation here. Pressure for the system is conventionally provided by a suitable compressor 22 positioned and connected to be driven by the tractor engine 24.

Figure 2:
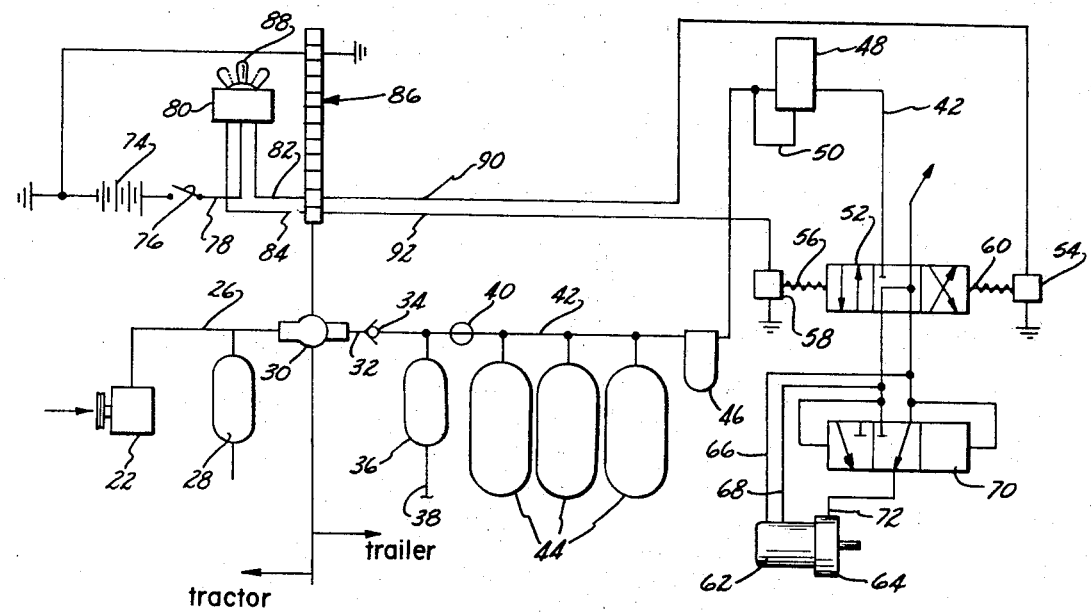
FIG. 2 is a circuit diagram of the electrical and pneumatic system embodying the invention, with the solenoid-operated control valve shown in the centered or neutral position.

Referring now in greater detail to FIG. 2, compressor 22 is shown as discharging air under pressure to a conduit 26 and thence to a tractor brake storage tank 28 and a compressed air hose coupler 30, known as a "Glad Hand" coupler, which couples the tractor air system and the trailer air system.

A conduit 32 of the trailer system is connected with coupler 30 and supplies compressed air for the trailer's needs through a check valve 34. Conventionally, the trailer is provided with air-actuated brakes, supplied through suitable control valves, not shown, from a brake tank 36 having a delivery conduit 38.

The trailer power assist, or auxiliary power system, "plugs into" the trailer brake system through an isolation valve 40 which is operator-operable. If a leak or some other malfunction develops in the power assist system, valve 40 may be closed to prevent loss of pressure from the brake system.

More specifically, a conduit 42 connects with isolation valve 40. Power assist air storage means such as pressure tanks 44 connect with conduit 42. An oiler 46 is preferably provided in the conduit 42 to lubricate the system. A valve 48 is provided in conduit 42, responsive to a predetermined low pressure in conduit 42 by way of a pilot pressure line 50 to shut off flow through valve 48. Thus, with the controls for the compressor set to activate compressor 22 when line pressure drops to 60 psi and to deactivate the compressor when line pressure rises to 120 psi, valve 48 is set to close when pressure in conduit 42 drops to 60 psi.

The purpose in closing valve 48 at 60 psi is to avoid long delays in building the auxiliary power system pressure back up to full line pressure. Conventionally, compressor 22 is of a capacity sufficient to keep brake system pressure between 60 psi and 120 psi for normal vehicle operation — i.e., braking. This means that compressor 22 is not large, so that it may well be pumping air throughout most of a normal operating cycle of the vehicle. The standard tractor compressor is relied on to keep the auxiliary power system charged, and it will not operate long at pressures below 60 psi. Accordingly, there would be little or no advantage in running the auxiliary power system so as to bleed the line pressure down to atmospheric, and there would be a corresponding disadvantage in having to wait while the system is recharged from atmospheric back up to a useful line pressure.

Downstream of valve 48, conduit 42 connects with the supply port of a solenoid-operated control valve 52. Valve 52 is a conventional, off-the-shelf item having a spring-centered position in which it is shown in FIG. 2 wherein the supply port is blocked internally and the two delivery ports of the valve are connected with the atmosphere. A solenoid 54 is energizable to shift the valve spool against the bias of one centering spring 56, and a solenoid 58 is energizable against the bias of another centering spring 60 to shift the spool in the opposite direction.

A power assist reversible air motor 62 is connected to drive axle 16, preferably a conventional axle having a differential to which motor 62 is drivingly connected through a pneumatically operated clutch 64. Clutch 64 may be any suitable clutch that is engaged as long as air above a predetermined pressure is applied thereto, and otherwise remains disengaged, so that the clutch output shaft is not rotatably driven by its input shaft when the clutch is in neutral.

The two delivery ports of valve 52 are connected with two ports in motor 62 by conduits 66 and 68. Conduits 66 and 68 are also connected with two supply ports in a conventional shuttle valve 70 which has one delivery port connected with clutch 64 by a conduit 72. Valve 70 also has a spool shifter port at each end of the valve housing, one of which is connected with conduit 66 and the other with conduit 68. The shuttle valve spool has two operating positions and is drilled so that, in one operating position, one supply port is connected through the spool to the sole delivery port, and in the other operating position, the other supply port is connected through the spool to the sole delivery port.

It will be noted that, in the neutral position of valve 52, both delivery ports of shuttle valve 70 and both ports of motor 62 are vented to atmosphere through control valve 52. Thus, no port in motor 62 or in clutch 64 is ever ported to atmosphere except through valve 52. Accordingly, motor 62 and clutch 64 can be protected against the entry of harmful substances by careful placement of valve 52 and protection of the exhaust port of the valve, as for example by suitable shielding, baffles, or the like.

The tractor is provided with a conventional electrical system including a battery indicated schematically at 74. Conventionally, one battery terminal is grounded and the other is connected with an "ignition" switch 76. A conductor 78 is connected with a three-position switch 80, from which two conductors 82 and 84 lead to an electrical connector 86 of the two-element plug-in type, one element being on the tractor and the other on the trailer. Switch 80 may incorporate a dead-man control and is provided with a control lever 88 having "Forward," "Reverse," and "Neutral" positions.

On the trailer side, conductors 90 and 92 are connected with electrical connector 86 so as to complete circuits with conductors 82 and 84 respectively on the tractor side. Conductor 90 is connected with the "Forward" solenoid 54, and conductor 92 is connected with the "Reverse" solenoid 58.

Figure 5:
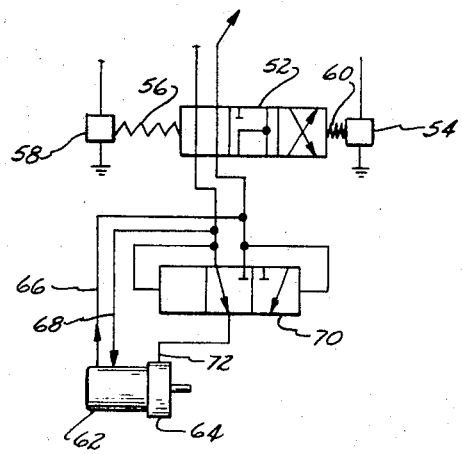
FIG. 5 is a view in section substantially on line 5—5 of FIG. 1 but on a larger scale, showing details of the roll axis elements.
Figure 5:
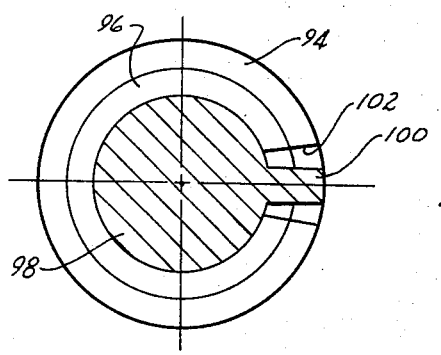

Reference is now made to FIG. 5 for a description of the roll capability of axle 8 relative to axle 6. It will be understood by those skilled in the art that a vehicle may be provided with a frame which provides the basic support for the components, they being fastened to the frame in any suitable manner; such structures are sometimes referred to as endoskeletal. Other vehicles have no frame as such, but comprise a body shell of sufficiently stiff and strong elements joined together which support such components as must be supported; such structures are sometimes described as exoskeletal.

The roll capability of axle 8 relative to axle 6 can be provided in either type of structure. FIG. 5 shows a cylindrical socket 94 which is carried by the tractor front or rear axle portion and is provided with a bearing bushing 96. A journal 98 on the other one of the articulated portions rides in the bearing 96 and is provided with a lug 100 extending in a radial direction beyond the journal surface and into a slot 102 provided in a portion of the ends of socket 94 and bushing 96. Arcuate space in slot 102 on each side of lug 100 permits the journal to roll either way approximately 10° from the position shown, which is that for a coplanar orientation of the front and rear axles.

OPERATION

As long as the vehicle runs on a surface that provides good traction, the power assist for the trailer axle is not needed and so is not engaged by the operator. Many military tractors drive both axles 6 and 8. If the tractor encounters terrain such that the tractive effort of all of its drive wheels is marginal or even less than necessary to keep the vehicle moving, the operator engages lever 88 and moves it into "Forward" or "Reverse" according to the immediate situation.

Figure 3:
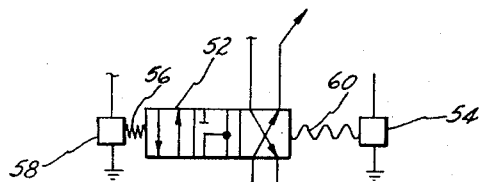
FIG. 3 is a portion of the diagram shown in FIG. 2, showing the pneumatic system elements in their operating position for forward drive of the auxiliary or power assist drive.

Assuming that lever 88 is moved to "Forward," a voltage is thereby applied to energize solenoid 54, moving the spool of valve 52 from the position shown in FIG. 2 to the position shown in FIG. 3, against the bias of spring 56. At the same time the air under pressure is provided to rotate air motor 62 in the forward direction, air under pressure is also applied to the right end of shuttle valve 70; accordingly, the spool of shuttle valve 70 shifts into the position shown in FIG. 3 if it is not already in that position, or is held in that position if it was already there. Air under pressure is thus applied to engage clutch 64. It will be noted that the return port for motor 62 is connected to the exhaust port of valve 52 via conduit 68 and the appropriate flow passage through the spool of valve 52. Air under pressure enters motor 62 through conduit 66, and expended air leaves through conduit 68, so that no motor port is open in the vicinity of the roadway to receive dust or other harmful foreign matter. Also, when the system returns to neutral, clutch 64 will be vented to atmosphere via conduit 72, shuttle valve 70, and control valve 52.

With motor 62 connected for forward rotation, trailer axle 16 is driven to provide extra tractive effort which in many cases will be enough to aid in moving the entire vehicle to a location where the tractor drive wheels have a combined total traction great enough to keep the vehicle moving. The operator returns switch 80 to "Neutral," de-energizing solenoid 54 and allowing valves 52 and 70 to return to the neutral positions shown in FIG. 2. Compressor 22 is then able to recharge tanks 44 and also the brake systems including tanks 28 and 36 to the maximum system pressure, namely 120 psi as indicated above.

If the pressure in conduit 42 should drop below the predetermined minimum (herein 60 psi), cut-off valve 48 would close to prevent further supply of air to motor 62. If the vehicle were then immobilized for insufficient traction, the operator would wait until the pressure in conduit 42 could be restored to a value high enough to reopen valve 48.

Figure 4:
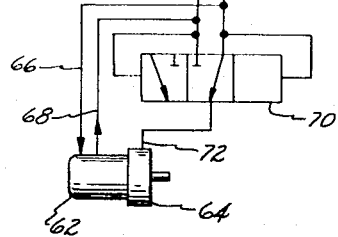
FIG. 4 is similar to FIG. 3 but for reverse drive.

Functioning of the system in reverse will be understood by those skilled in the art, in view of the above and by reference to FIG. 4, and need not be detailed here.

It will be appreciated from the foregoing discussion of the operation that some of the principal advantages of the invention may be realized without the roll-axis feature provided by the lateral roll capability between front and rear tractor axles. Operation of the roll feature will now be considered.

It will readily be appreciated by those skilled in the art that the variations in terrain encountered by a land vehicle will be much greater off-highway than when the vehicle operates on a good paved road. Moreover, the lateral differences in attitude between the tractor front and rear axles can and often will be such that the accommodation afforded by the springs may not be enough to keep all of the wheels on the ground, or even if there just barely is ground contact for one wheel, it might be so slight that the wheel quickly "spins out" and thus diminishes the total possible tractive effort.

FIG. 5 details means to permit the front and rear tractor axles to rest on planes that are as much as 20° out of coincidence without the need to deform the springs to avoid lifting a wheel off the ground. The trailer axle attitudinal plane is defined by the tractor rear axle, which is substantially closer to the trailer axle than the tractor front axle is. The lateral roll capability thus allows the tractor-trailer vehicle to traverse terrain of greater unevenness in a lateral direction without a semi-trailer wheel losing traction than a vehicle without roll capabilities could do.

I wish it to be understood that I do not desire to be limited to the exact details of construction shown and described, for obvious modifications will occur to a person skilled in the art.

What is claimed is:

1. In a land vehicle having a multi-axle wheeled tractor, a source of air under pressure on the tractor, an air brake system on the tractor connected to recieve air under pressure from said source, a wheeled semi-trailer coupled with the tractor, and an air brake system on the semi-trailer connected to receive air under pressure from said source and including a brake storage tank, the invention comprising:
   a. power assist reversible air motor means to drive at least one of the semi-trailer wheels;
   b. a clutch connected between said reversible air motor and the wheel driven thereby, the clutch adapted to respond to air under pressure to complete the drive of said trailer wheel by said reversible air motor;
   c. power assist air storage means;
   d. means connecting said assist storage means with the brake storage tank;
   e. solenoid-operated air valve means having neutral, forward, and reverse operating positions;
   f. means to conduct air from said assist storage means to the solenoid-operated valve means;
   g. means to conduct air from the solenoid-operated valve means to said reversible air motor means; and h. means for venting the clutch to atmosphere at a point remote from the clutch.

2. A land vehicle as in claim 1, said clutch venting means including a shuttle valve.

3. In a land vehicle having a multi-axle wheeled tractor, a source of air under pressure on the tractor, means permitting one axle to roll relative to another axle about an axis substantially perpendicular to the axle axes, a fifth wheel mounted on the tractor to roll with one axle relative to said another axle, a wheeled semi-trailer coupled with the tractor by means of the fifth wheel, and an air brake system on the semi-trailer connected to receive air under pressure from said source and including a brake storage tank, the invention comprising:

a. power assist reversible air motor means to drive at least one of the semi-trailer wheels;

b. a clutch connected between said reversible air motor and the wheel driven thereby, the clutch adapted to respond to air under pressure to complete the drive of said trailer wheel by said reversible air motor;

c. power assist air storage means;

d. means connecting the power assist air storage means with the brake storage tank;

e. solenoid-operated air valve means having neutral, forward, and reverse operating positions;

f. means to conduct air from the power assist air storage means to the solenoid-operated valve means;

g. means to conduct air from the solenoid-operated valve means to said reversible air motor means; and h. means for venting the clutch to atmosphere at a point remote from the clutch.

4. A land vehicle as in claim 3, said clutch venting means including a shuttle valve.

* * * * *